United States Patent [19]
Knott et al.

[11] Patent Number: 5,402,615
[45] Date of Patent: Apr. 4, 1995

[54] FIRE RETARDANT BARRIER SYSTEM AND METHOD

[75] Inventors: B. R. Knott; G. P. Yiasemides, both of Wantage, United Kingdom

[73] Assignee: International Copper Association, Ltd., New York, N.Y.

[21] Appl. No.: 976,083

[22] Filed: Nov. 13, 1992

[51] Int. Cl.$^6$ .......................... E04C 2/00; B32B 15/00
[52] U.S. Cl. .................... 52/309.1; 52/232; 52/408; 52/588.1; 428/920; 428/921
[58] Field of Search ........... 52/232, 584, 588, 309.1, 52/309.2, 581, 593, 408; 428/920, 921

[56] References Cited

U.S. PATENT DOCUMENTS

| | | | |
|---|---|---|---|
| 1,484,175 | 2/1924 | Elmendorf | 52/588 |
| 1,484,206 | 2/1924 | Birkholz | 52/602 |
| 3,149,021 | 9/1964 | Goepfert et al. | 161/214 |
| 3,313,073 | 4/1967 | Matthews | 52/309.2 |
| 3,570,199 | 3/1971 | Gartner | 52/232 |
| 3,819,468 | 6/1974 | Sauder et al. | 428/920 |
| 3,913,290 | 10/1975 | Billing et al. | 52/347 |
| 4,064,359 | 12/1977 | Peterson et al. | 174/107 |
| 4,069,075 | 1/1978 | Billing et al. | 156/82 |
| 4,069,629 | 1/1978 | Piazza | 52/309.4 |
| 4,122,203 | 10/1978 | Stahl | 428/921 |
| 4,276,332 | 6/1981 | Castle | 428/36 |
| 4,292,358 | 9/1981 | Fryer et al. | 428/135 |
| 4,304,082 | 12/1981 | Peters | 52/507 |
| 4,467,577 | 8/1984 | Licht | 52/232 |
| 4,485,601 | 12/1984 | De Boel | 52/232 |
| 4,729,916 | 3/1988 | Feldman | 428/182 |
| 5,032,447 | 7/1991 | Bailey | 428/920 |
| 5,098,795 | 3/1992 | Webb et al. | 428/594 |
| 5,139,839 | 8/1992 | Lim | 428/920 |
| 6,055,926 | 11/1977 | Byrd, Jr. | 52/475 |

FOREIGN PATENT DOCUMENTS

| | | |
|---|---|---|
| 1295745 | 9/1969 | Germany . |
| 55-113664 | 9/1980 | Japan . |
| 60-45060 | 3/1985 | Japan . |
| 2031103 | 4/1980 | United Kingdom . |

*Primary Examiner*—Carl D. Friedman
*Assistant Examiner*—Winnie Yip
*Attorney, Agent, or Firm*—Pennie & Edmonds

[57] ABSTRACT

A flexible barrier for preventing the spread of fire through areas of a building includes a layer of inorganic fibrous material sandwiched between two panels of material having sufficiently high thermal conductivity to diffuse and dissipate heat without burning when exposed to a flame. The panels and blanket are joined together with a filament having sufficiently high tensile strength and resistance to heat to maintain the panels and layers in laminar relation. Plural barrier sections may be attached together with the filament at a factory or at the installation The laminar panel and blanket combination is lightweight, easily cut and installed, and advantageously retards the passage of heat when placed across an opening.

25 Claims, 5 Drawing Sheets

FIRE RETARDANT BARRIER SYSTEM AND METHOD

BACKGROUND OF THE INVENTION

The present invention relates to flexible fire protective insulating barriers for inhibiting the spread of fire within buildings and other structures.

In many countries, building regulations require the installation of fire resistant barriers between floors and other cavities. Conventional cavity barrier systems are made of either glass fiber or mineral wool. These materials are typically woven into blankets or pressed into sheet or blocks, and their outer surfaces are often coated with an intumescent material for enhanced performance. Intumescent coatings react to heat in excess of 100° C. to give a carbon char with high insulating properties. Cavity barriers of this type are heavy, must be assembled on site, and do not easily accommodate pipes, ducts, and other services which must pass through the barrier. Installation costs associated with these conventional cavity barriers are also high because of the labor required to cut and fit them into place across a given opening.

It has also been proposed in U.S. Pat. No. 4,292,358 to fire-proof ceilings, partitions, and the like with flexible barriers comprised of a single metal foil of aluminum sandwiched between a number of expanded metal sheets that have been coated on one or both sides with a heat actuated and resistive intumescent coating. The application of the intumescent coating is usually carried out by spraying under controlled factory conditions. Barriers constructed of this type are lightweight and are easier to cut and install than those of the fibrous type described above. However, the relatively low thermal conductivity and hot strength of the aluminum used in the construction of the foil and expanded sheets render such barriers unsatisfactory at very high temperatures. Also, when exposed to fire, the intumescent coatings generate large amounts of dense, acrid smoke.

SUMMARY OF THE INVENTION

In order to overcome the above mentioned problems associated with the prior art, and in accordance with the present invention, individual fire protective insulating barrier sections comprise in laminar relation, first and second panel members and a layer of inorganic fibrous material disposed therebetween. The first and second panel members are made of a material of sufficiently high thermal conductivity to dispense heat without burning when subjected to a flame. The panel members may be made of such thermally conductive material as copper, aluminum, silver or alloys thereof and may be in the form of sheets, woven gauze, or any other planar configuration.

The layer of inorganic fibrous material is preferably a blanket of ceramic fibers. The blanket may be comprised of alumina, silica, or mixtures or combinations thereof.

Each barrier section further comprises means for securing the panel members to the layer of inorganic fibrous material. The securing means includes a filament having sufficient heat resistance and tensile strength to retain the panel members and inorganic fibrous material in adjacent contact in the laminar relation and is preferably made of a metal wire. The metal wire of the filament may comprise copper, chromium, nickel, iron, or alloys thereof.

Each barrier section may also include a third panel member made of a material of sufficiently high thermal conductivity to dispense heat without burning when subjected to a flame, and a second layer of inorganic fibrous material interposed in laminar relation between said second panel and said third panel.

A method of joining individual barrier members together to form a unitary barrier of sufficient size to fit across any cavity opening desired comprises the steps of forming a plurality of barrier members by placing a respective blanket of inorganic fibrous material between first and second panel members made of a material of sufficiently high thermal conductivity to dispense heat without burning when subjected to a flame, placing a side of a first barrier member adjacent a side of a second barrier member, and joining the first barrier member to the second barrier member.

The method of joining individual barrier members together may further comprise placing a side of at least one additional barrier member adjacent to a side of one of the first or second barrier members and joining the additional barrier member to the other barrier member. The method of joining individual barrier members together may include selecting for each barrier member a layer of inorganic material which has a smaller perimeter than the perimeter of each panel member, bending at least one end of each panel member away from the corresponding layer of inorganic fibrous material to form a flange, and arranging adjacent layers of inorganic fibrous material and flanges of adjacent barrier members in abutting contact prior to the joining step.

Alternatively, the method of joining individual barrier members together may include selecting for each barrier member a layer of inorganic material which has a perimeter substantially equal to the perimeter of each panel member, bending at least one end of each barrier member in the same direction to form a flange, and arranging adjacent flanges of adjacent barrier members in abutting contact prior to the joining step.

The method of joining individual barrier members together may alternatively include selecting for each barrier member a layer of inorganic material which has a smaller perimeter than the perimeter of the first panel member but a smaller perimeter than the perimeter of the second panel member, arranging adjacent layers of inorganic fibrous material in abutting contact and arranging at least one side of the first panel member of a first barrier member in overlapping relation to a side of a second panel member of a second barrier member prior to said joining step.

The method of joining the individual barrier members together may comprise, as the joining step, stitching the first barrier member to the second barrier member using a filament having sufficiently high heat resistance and tensile strength to maintain contact between said barrier members when exposed to flame.

It is thus an object of this invention to provide a fire protective insulating barrier which is easier and less expensive to manufacture and install than the products of the prior art.

It is yet another object of this invention to provide a fire protective insulating barrier which will exhibit good durability and weatherability.

It is still another object of this invention to provide a fire protective insulating barrier which does not generate smoke or fumes when exposed to a fire.

It is finally another object of the invention to provide a method of forming a fire protective insulating barrier from plural sections joined together without a significant reduction in insulation properties and integrity.

DETAILED DESCRIPTION OF THE INVENTION

Figure 1:
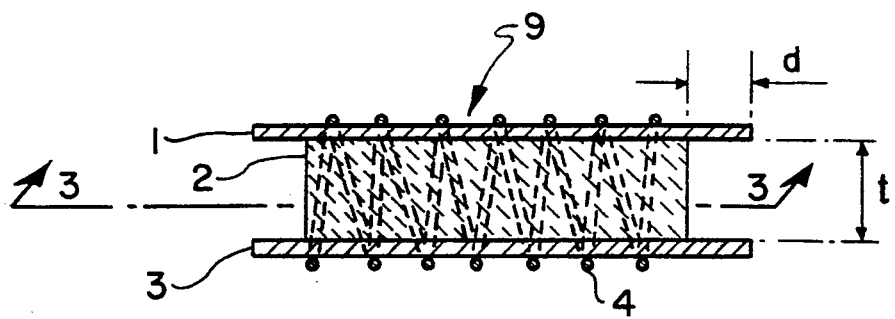
FIG. 1 is an enlarged sectional view of a single laminar section of the flexible barrier in accordance with a first embodiment of the present invention.
Figure 2:
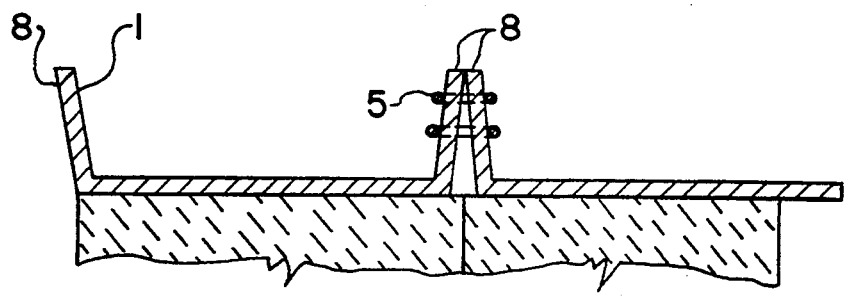
FIG. 2 is an enlarged sectional view of the joining of adjacent laminar sections to form a flexible barrier in accordance with the first embodiment of the present invention.
Figure 3:
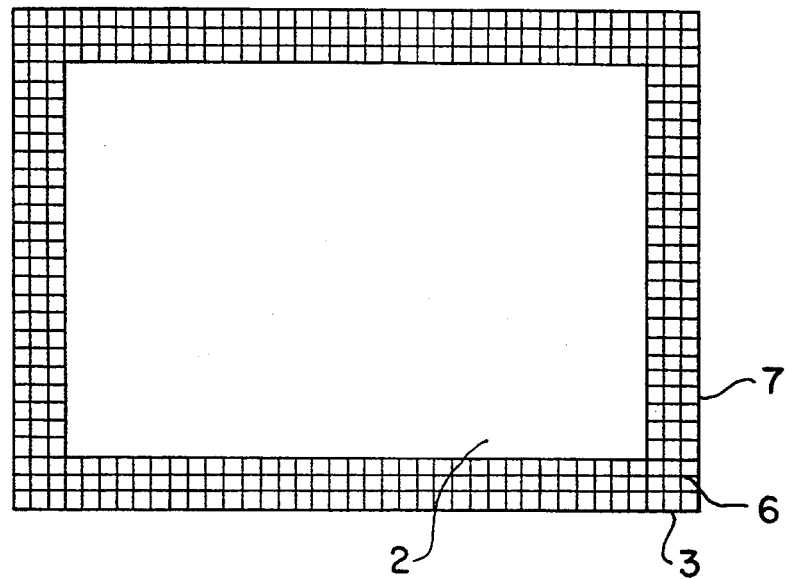
FIG. 3 is a partial plan view of the laminar section of FIG. 1 taken along section 3—3.

Referring to FIGS. 1 and 2, the fire protective barrier of the present invention comprises a blanket of inorganic fibrous material 2 sandwiched between two metal panels 1 and 3.

The inorganic fibrous material must exhibit good insulating properties and remain stable at high temperatures. Ceramic fibers of silica or alumina and silica, glass wool, mineral wool or rock wool each exhibit high insulating and temperature withstand capabilities and are thus suitable as blanket materials. Naturally, blanket thickness and density will vary with the material selected and the degree of insulation and heat resistance required. The latter requirements are typically dictated by municipal fire protection codes.

The preferred inorganic blanket material is a flexible fire retardant composition of ceramic fibers preferably comprising approximately 50% $Al_2O_3$ and 50% $SiO_2$ and having a density of 128 kg/m$^3$. The preferred composition used for the preferred blanket 2 is commercially available in matted form as "Durablanket S" and is manufactured by Carborundum Inc. of St. Helens, England. The long ceramic fibers of the preferred blanket are crosslocked by a forming process to produce a matted structure having a multitude of air pockets, thus providing good insulating properties.

Although a blanket thickness t of 25 mm has been found to provide reliable insulating properties, it will be understood that the precise thickness may be varied in accordance with the degree of heat resistance and insulation actually desired.

In a preferred embodiment, the metal panels 1 and 3 are composed of metallic material of high purity having a relatively high heat strength and heat conductivity (K), where K is expressed in cal-cm-sec/cm$_2$-°C. For this purpose it has been found that copper (K=0.95 for 99.9% purity), aluminum (K=0.53) or silver (K=1.0 for sterling silver provide excellent results. Other materials having lower thermal conductivities may be used with less efficient results, such as brass (K=0.3 for 70% Cu 30% Zn), bronze (K=0.2 for 95% Cu, 5% Sn), iron (K=0.18 for 99.9% purity), or various grades of steel (K=0.12 for 1020, K=0.115 for 1040, K=0.11 for 1080, K=0.035 for 18Cr8Ni stainless).

High panel thermal conductivity is of particular importance in that it substantially reduces or eliminates the incidence of localized "hot spots" by rapidly diffusing and dissipating buildups of heat on the panel surface directly exposed to fire. High panel heat strength in tension and shear is also important to minimize the tearing or separation of the metal panels due to the impacts of falling objects during a fire.

The metal panels may be provided as sheets, woven gauze or screens. Because metal sheets are costlier and more difficult to cut, the panels of the preferred embodiment are composed of woven metal gauze. Although the need for cutting metal sheets at an installation site might be reduced by pre-measuring the cavity or surface to be protected before ordering the sheet sections from the factory, some cutting will always be required to accommodate special conditions. When compared to metal sheets, woven gauze is much more easily cut, is less expensive, and can be supplied in standardized lengths and adapted to fit a variety of openings without special handling at the factory. The result is a lower price, quicker availability, and lower installation cost.

A significant factor in the cost of installation of the barriers of the present invention will be vertical joining of individual sections of the barrier to each other in order to achieve a sound fire seal at the joints between the individual sections. In order to minimize installation costs, the number of joints should be reduced to a minimum by maximizing the width of individual cavity barrier lengths. The precise panel sheet thickness or mesh strand size may be varied in accordance with the metal or metal alloy selected.

In the preferred embodiment, the metal panels will be formed from strands of wire of various diameters of about 0.35 mm to 0.45 mm, with varying numbers of strands per centimeter of about 10–18. Caution, however, should be used in determining the mesh size used. At high temperatures, a very fine mesh may break and permit heat to pass directly to the blanket member while a mesh that is too coarse may be inadequate to diffuse and dissipate the heat by conduction.

Excellent results have been obtained using 16 mesh woven gauze formed of 0.375 mm diameter strands of copper 6 and 7. The melting point of copper (1083° C.) is significantly higher than aluminum and has superior hot strength in both tension and shear. It should be understood that the mesh and strand sizes selected were chosen for their commercial availability and it should be readily appreciated that other mesh and strand sizes may be used.

Notwithstanding the benefits of gauze in the ease of installation and as noted earlier, metal sheets may be used instead of the woven screens. For example, copper sheets having a thickness equal to or greater than 0.2 mm have been found to possess a rate of heat dissipation comparable to that of the copper gauze of the preferred embodiment described above.

As best seen in FIG. 2, the screens 1 and 3 and the blanket 2 are preferably held together by stitches 4 through the barrier at intervals around the edge of the barrier. These stitches may be made from any heat resistant, high tensile strength filament. Preferably the filament is made of metal wire. Nichrome, an alloy of nickel and chromium, has been found to exhibit the desired properties of high heat resistance and tensile strength in wire form and is used in the filament of the preferred embodiment. It is understood that other conventional joining means within the skill of an ordinary artisan, such as clips, clamps, or other mechanical fastening means, may be used to hold the layers and panels to together.

With reference to FIG. 1, a suitable length and width is selected for the metal panels 1 and 3 so that their respective side edges extend a distance d beyond the corresponding edges of a fibrous blanket 2 placed therebetween. As will be explained more completely below, the distance d chosen will determine the length of flanges 8 used for the purpose of joining adjacent sections together. As best shown in FIG. 2, in order to join adjacent individual barrier sections 9 of the preferred embodiment together, the extending edges of adjacent upper panels 1 are bent outward to form flange portions 8 and the opposing edges of corresponding adjacent blankets 2 are brought together in abutting relation. In a similar manner not shown, the extending edges of the respective lower panels 3 are also bent outward to form respective flange portions. The adjacent panels are then stitched together at predetermined intervals using one or more filaments 5 to form a "butt joint". The distance d chosen will determine the total surface area of the flange portions and should be of a magnitude sufficient to facilitate the insertion of the filament 5 through adjacent flanges.

The stitches formed by filament 5 may be spaced at appropriate intervals along the length of each panel joint and along the edges of upper and lower panels 1 and 3, Close spacing of the stitches, or even additional parallel stitches, may be desirable to ensure greater seam strength and reduce the risk of panel separation.

Figure 6:
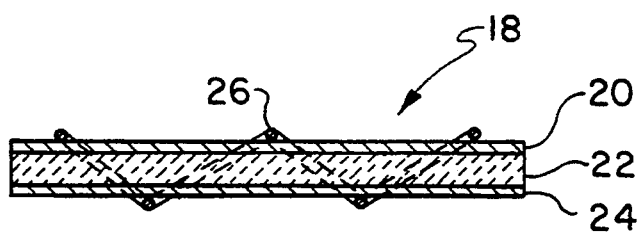
FIG. 6 is an enlarged sectional view of a single laminar section of the flexible barrier in accordance with a second embodiment of the present invention.
Figure 7:
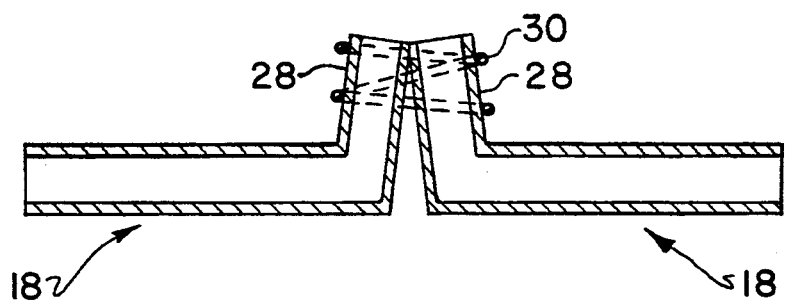
FIG. 7 is an enlarged sectional view of the joining of adjacent laminar sections to form a flexible barrier in accordance with the second embodiment of the present invention.

In an alternate embodiment, illustrated in FIGS. 6 and 7, individual barrier sections 18 are constructed so that relevant side edges of panels 20 and 24 are substantially contiguous with corresponding edges of the blanket 22. The respective perimeters of the panels and layer are substantially equal. The panels and blanket of each barrier section are stitched together with filament 26. Adjacent side regions 28 of the individual sections are then folded to form flanges, and adjacent flanges are stitched together at predetermined intervals using filament 30 to form a modified lap joint.

Figure 8:
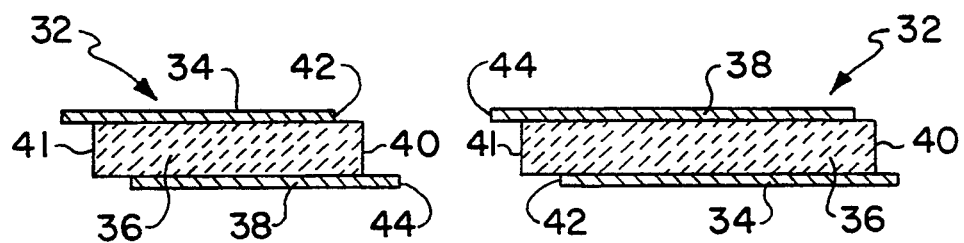
FIG. 8 is an enlarged sectional view of two laminar sections of the flexible barrier in accordance with a third embodiment of the present invention.
Figure 9:
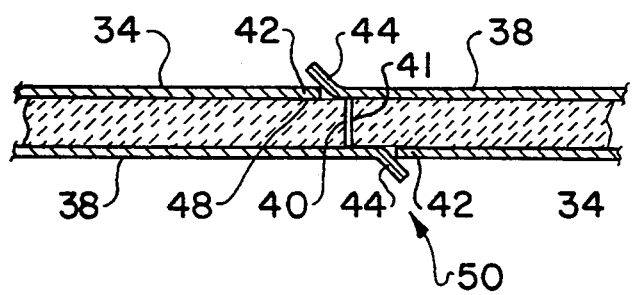
FIG. 9 is an enlarged sectional view of the joining of adjacent laminar sections to form a flexible barrier in accordance with the third embodiment of the present invention.

In yet another embodiment, illustrated in FIGS. 8 and 9, individual barrier sections 32 are constructed so that edges 42 and 44 of first and second panels 34 and 38 are offset relative to one another as shown in FIG. 8. Adjacent edges 40 and 41 of blankets 36 to be joined are butted against each other so that edge 42 of the first barrier is in overlapping relation with edge 44 of the second barrier. Likewise, edge 44 of the first barrier is in overlapping relation with edge 42 of the second barrier. Respective overlapping edges are joined together with a filament 48 to form a single barrier 50.

Figure 10:
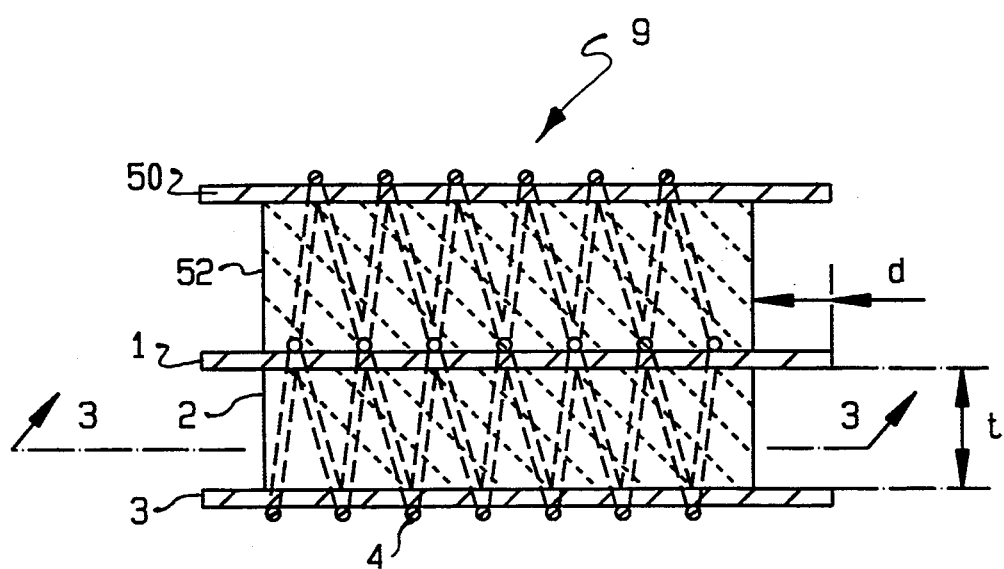
FIG. 10 is an enlarged section of a double laminar section of the flexible barrier in accordance with a fourth embodiment of the invention.

Further variations in the joining of adjacent barrier sections are possible. For example, using any of the above described panel joint configurations, the position and/or size of the blanket may be altered so that a single blanket extends between multiple panel sections. It is even conceivable that a single roll of inorganic fibrous material may be utilized for the entire barrier. Likewise, the size of the metal panels need not be directly dependent on the size of the blanket used. Thus, multiple blanket sections may be placed between a single pair of metal panels. Also, it is possible to have plural, alternating layers of blankets and metal panels as shown in FIG. 10. FIG. 10 illustrates that a third metal panel 50, and a second fibrous blanket 52 can be added in an alternative embodiment.

In all cases, gaps between the blanket material of adjoining sections should be kept below 20 mm to avoid premature failure.

EXAMPLE 1

A fire resistant barrier test panel comprises a 0.3 square meter blanket of inorganic fibers comprising approximately 50% $Al_2O_3$ and 50% $SiO_2$, having a density of 128 kg/m$^3$ and a thickness of 25 mm, sandwiched between two 0.3 square meter sheets of woven copper gauze. The gauze is 16 mesh with 0.375 mm diameter strands of copper. The panels and blanket were held together with stitches of Nichrome wire through the panels at intervals around the edge of the panel.

The test panel was tested in accordance with the requirements of BS 476 Part 8 (1972) and Part 22 (1987).

Briefly stated, this test comprises fitting a test panel across the open end of a gas fired box furnace and exposing it to temperatures given by a standard heating curve. This heating curve is designed to simulate the effects of a real fire with a furnace temperature of 850° C. after 30 minutes, 950° C. after 1 hour, and 1100° C. after 2 hours.

To satisfy the integrity criterion of this test, the panel must remain intact as a flame-proof and fume-proof barrier for 30 minutes. To satisfy the insulation criteria of this test, for 15 minutes the mean temperature of the face of the unexposed panel must not increase above its initial (ambient) temperature by more than 140° C. and no point on the face of the unexposed panel may increase in temperature by more than 180° C.

A panel according to this example has been found to satisfy the integrity requirements for 23 minutes and the insulation requirements for at least 60 minutes.

EXAMPLE 2

A fire resistant barrier test panel has been made as described in Example 1 save that the blanket of inorganic fibers is increased in thickness to 50 mm.

When subjected to the same test, the panel insulation and integrity remained satisfactory for at least 124 minutes.

EXAMPLE 3

A fire resistant barrier test panel has been made as described in Example 1 save that the single blanket has been replaced with a 0.2 mm thick, 0.3 square meter copper panel sandwiched between two 0.12 mm thick, 0.3 square meter blankets. The two outer gauze panels, two blankets, and central copper sheet are joined together using stitches of Nichrome wire along the panel edges.

A panel according to this example has been found to satisfy the integrity requirements for at least 32 minutes and the insulation requirements for 22 minutes.

EXAMPLE 4

A fire resistant barrier test panel has been made as described in Example 1 save that the woven copper gauze panels have been replaced with two 0.2 mm thick, 0.3 square meter copper panel. The panels and blanket are stitched together with Nichrome wire as in the previous examples.

A panel according to this example has been found to satisfy the integrity requirements for at least 124 minutes and the insulation requirements for 20 minutes.

EXAMPLE 5

It was shown during examples 1–3 that some damage to the blanket material, such as that occurring when completely exposed to the hot furnace interior, could be tolerated. This tolerance was ascribed to the high conductivity of copper gauze carrying away localized heat from the region of damage to the bulk of the non-exposed face of the panel. To compare the performance of copper and steel gauze, a fire test was conducted in accordance with BS 476 Part 9 (1972) and BS 476 Part 22 (1987) as detailed in Example 1.

A one square meter test panel has been prepared by combining two 0.5 square meter vertical sections. The first section was formed of the same materials and in the same manner as described in Example 1. The second section was formed in a manner similar to that of the first section except that steel gauze of the same mesh and strand size is used instead of copper. Horizontal gaps in the blanket material of 40 and 20 mm were incorporated.

When subjected to the fire test, failure of integrity was experienced at the 40 mm gap region after 13 minutes for the steel gauze section and 14 minutes for the copper gauze section. Hot gases escaping from the 40 mm gap region resulted in premature failure of integrity of the 20 mm gap region for both the copper and steel gauze sections. The time to failure for the steel and copper gauze sections were 41 and 39 minutes respectfully. In this instance, the higher conductivity of the copper gauze promoted premature failure due to insufficient clearance between the 40 mm and 20 mm gaps in the blanket material.

EXAMPLE 6

Figure 5:
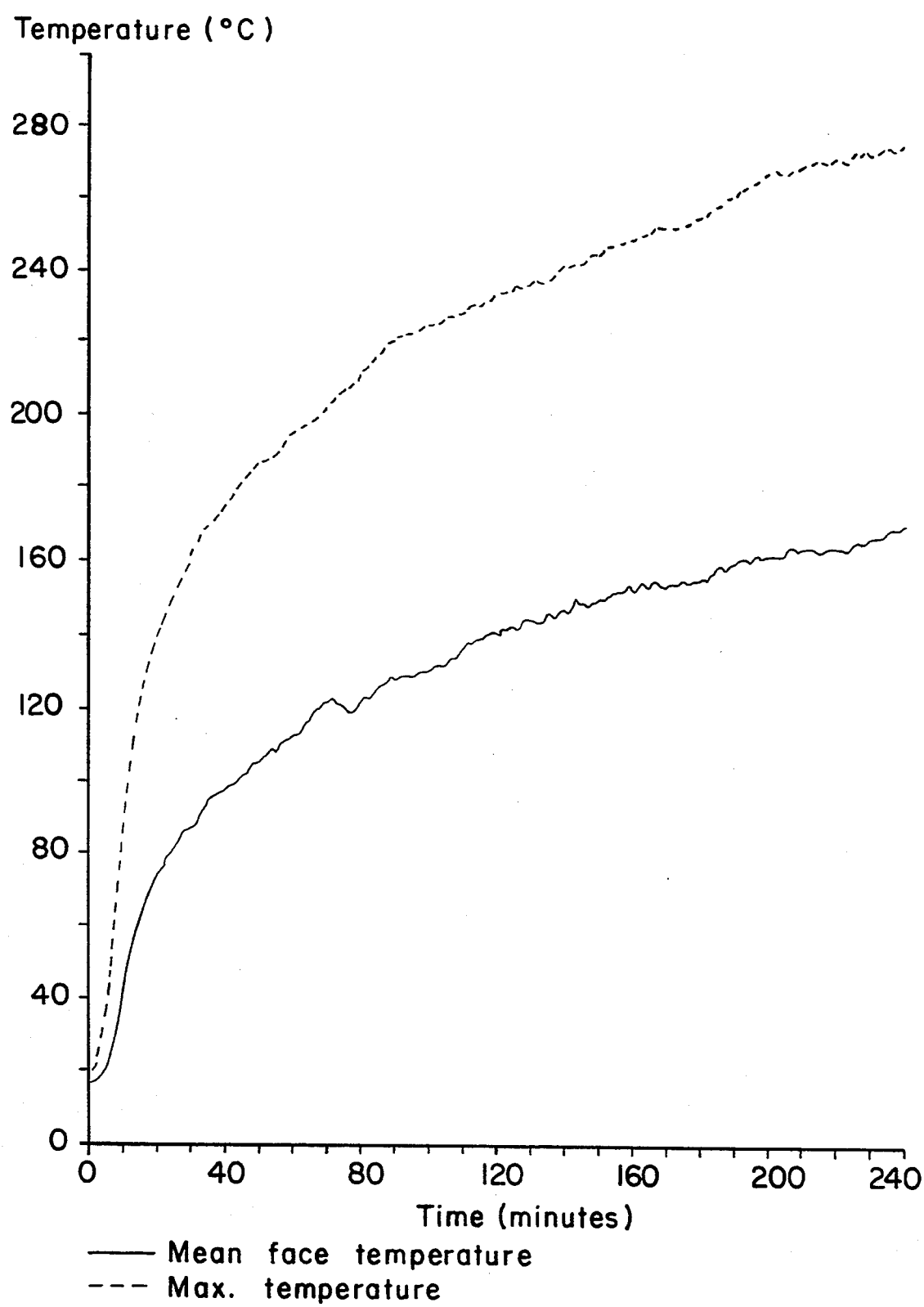
FIG. 5 is a chart showing the comparison of average and maximum surface temperatures of the unexposed surface of the fire barrier during use of the invention.

A 1 square meter test barrier has been constructed by joining individual panels. Each individual panel has been prepared using the same materials and in the same manner as described in Example 1. The test panel incorporated a vertical "butt-joint" as shown in FIG. 2 and a vertical "lap-joint" as shown in FIG. 5.

For manufacture of the "butt joint", the relevant edges of the panel were constructed such that the gauze extended beyond the edges of the blanket to a distance of 50 mm. The elements of each constructed panel were held together by stitches of Nichrome wire. Adjacent lengths of copper gauze were stitched together, at 150 mm intervals using Nichrome wire, pulling the abutting blankets into close contact.

For manufacture of the "lap-joint", the panel was constructed such that the edges of the blanket were coincident. The outermost 50 mm of two adjacent panels were bent so that, as the two adjoining panels were brought together, the edges formed a lap joint. The two edges were stitched together at 150 mm intervals using Nichrome wire.

A fire test was conducted in accordance with BS 476 Part 9 (1972) and BS 476 Part 22 (1987) as detailed in Example 1. The test barrier was positioned so that the lap joint was exposed to the hot furnace gases during the test.

Both joint configurations were found to satisfy the integrity requirements of the test for at least 60 minutes.

EXAMPLE 7

Figure 4:
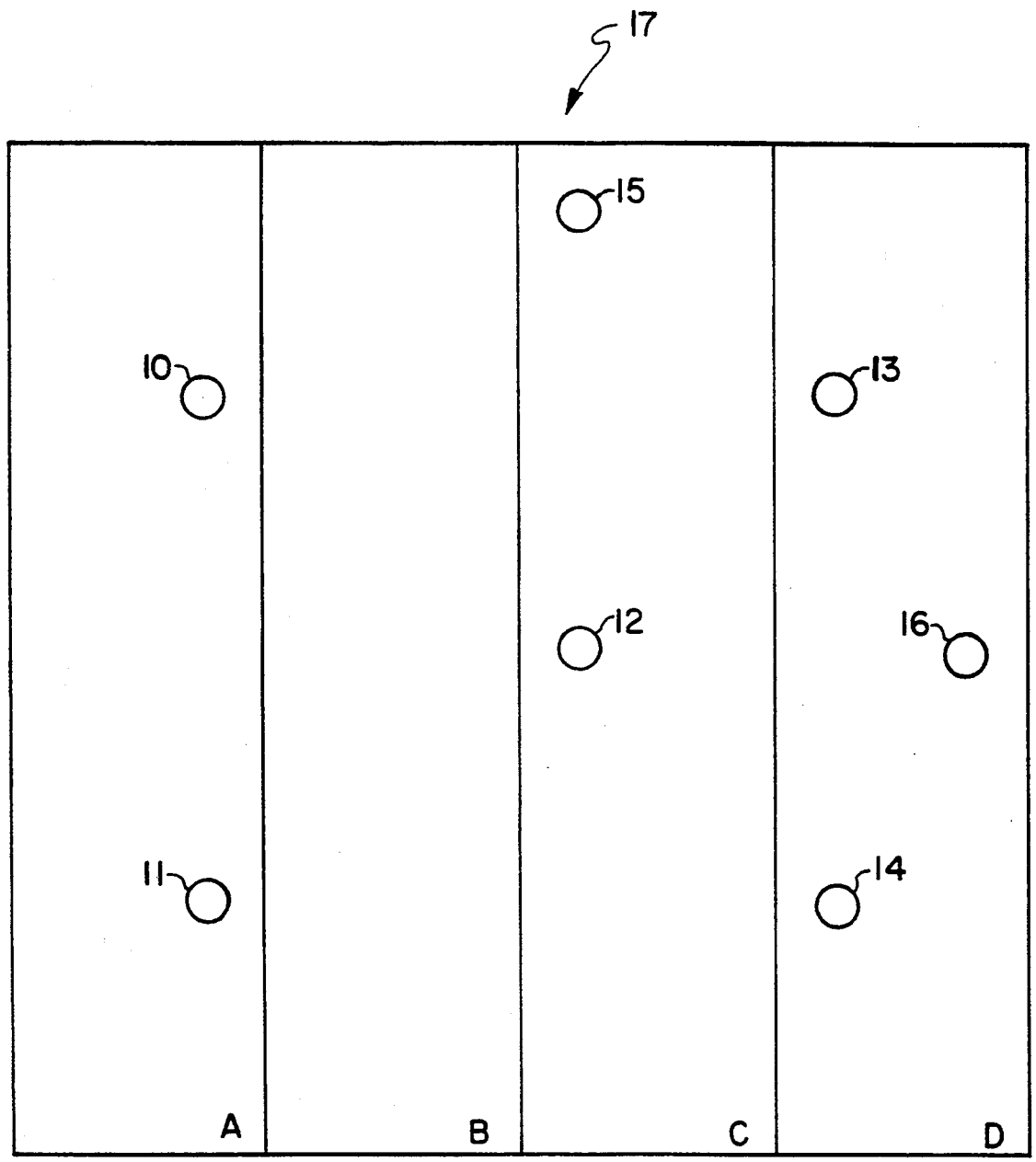
FIG. 4 is an elevation view of a plurality of barrier members joined together in accordance with the first embodiment to form a unitary cavity barrier.

Four 3.35 meter long test panel sections, were manufactured from copper gauze and inorganic fiber blanket as described in Example 1. The width of the copper gauze for each panel section was 910 mm. The four sections, A, B, C, and D, were "butt-joined" in the manner described in the preceding example to form a complete cavity barrier which was nominally 3350 mm high by 3350 mm wide. The completed barrier 17 is illustrated in FIG. 4. Disc type thermocouples 10–16 were attached to record temperatures on the unexposed surface of the barrier.

A fire test was conducted on the cavity barrier of this example in accordance with BS 476 Part 9 (1972) and BS 476 Part 22 (1987) as detailed in Example 1. The test was terminated after 240 minutes.

Integrity of the joined cavity barrier panels was maintained throughout the test. Insulation failure was experienced after 62 minutes. FIG. 9 represents the recorded mean and maximum surface temperatures recorded during the test. At the time of insulation failure, the mean surface temperature was 930° C. and at the termination of the test it was 1127° C.

It will be understood that various changes in the details, materials, steps and arrangement of parts, which have been herein described and illustrated in order to explain the nature of the invention, may be made by those skilled in the art within the principle and scope of the invention as expressed in the appended claims. While for purposes of an exemplary showing, the disclosed fire barrier has been described and illustrated for use across openings, passageways, and the like, it will be understood that the principle of the present invention has equal applicability to use as a ventilating attachment to ceilings, walls, or floors or as a protective cover around piping, electrical conduits, and other structures.

What is claimed is:

1. A fire retardant barrier member for use in sealing penetrations through walls, floors, ceilings, and partitions of a building, said barrier comprising in laminar relation, first and second panel members and a layer of inorganic fibrous material disposed therebetween, the first and second panel members being made of a material of sufficiently high thermal conductivity to dispose heat without burning when subject to a flame, wherein one of the panel members comprises a woven metal gauze, the metal in the woven metal gauze having a heat conductivity of at least 0.95 cal-cm-sec/cm$^2$-°C. and the gauze having a sufficient number of interwoven strands to prevent heat from directly contacting the inorganic fibrous material.

2. The barrier member of claim 1 wherein the metal is copper.

3. The barrier member of claim 1 wherein the layer of inorganic fibrous material is a blanket of ceramic fibers.

4. The barrier member of claim 1 further comprising means for securing the panel members to the layer of inorganic fibrous material.

5. The barrier member of claim 4 wherein the securing means comprises a filament having sufficient heat resistance and tensile strength to retain the panel members and inorganic fibrous material in adjacent contact in the laminar relation.

6. The barrier member of claim 5 wherein the filament is made of a metal wire.

7. The barrier member of claim 6 wherein the metal wire of the filament comprises copper, chromium, nickel, iron, or alloys thereof.

8. The barrier member of claim 6 wherein the metal wire is copper or chromium.

9. The barrier member of claim 1 further including a third panel member made of a material of sufficiently high thermal conductivity to dispense heat without burning when subjected to a flame, and a second layer of inorganic fibrous material interposed in laminar relation between said second panel and said third panel.

10. The barrier member of claim 1 wherein the woven gauze has about 10 to 18 wire strands per centimeter; each wire having a diameter of between about 0.35 to 0.45 millimeters.

11. A fire retardant barrier member for use in sealing penetrations through walls, floors, ceilings, and partitions of a building, said barrier comprising in laminar relation, first and second panel members and a layer of inorganic fibrous material disposed therebetween, the first panel member comprising a woven gauze made of a metal having a thermal conductivity of at least 0.95 cal-cm-sec/cm$^2$-°C., the gauze having a sufficient number of interwoven strands to prevent heat from directly contacting the inorganic fibrous material and to dispense heat without burning when subjected to a flame, the layer of inorganic fibrous material comprising a blanket of ceramic fibers.

12. The barrier member of claim 11 wherein the first panel member has a perimeter which is of a different length than the perimeter of the layer of inorganic fibrous material.

13. The barrier member of claim 12 wherein the first and second panel members and the layer of inorganic fibrous material each have a perimeter, the perimeter of the first panel member being greater than the perimeter of the layer of inorganic fibrous material and the perimeter of the layer of inorganic fibrous material being greater than the perimeter of the second panel member.

14. The barrier member of claim 11 wherein each panel member has a perimeter which is greater than that of the layer of inorganic fibrous material.

15. The barrier member of claim 14 wherein the panel members and layer of inorganic fibrous material are rectangular in configuration, one side of the barrier member having the layer of inorganic fibrous material recessed from the ends of the panel members.

16. The barrier member of claim 15 wherein at least one of the ends of each panel member is bent away from the layer of inorganic fibrous material to form a flange.

17. The barrier system of claim 11 wherein each of the panel members comprises a woven metal gauze.

18. The barrier member of claim 17, wherein the metal of the woven metal gauze of both panel members is copper.

19. The barrier member of claim 11 wherein the woven gauze has about 10 to 18 wire strands per centimeter; each wire having a diameter of between about 0.35 to 0.45 millimeters.

20. A fire retardant barrier system comprising a plurality of barrier members, said system comprising:
a plurality of barrier members, wherein each barrier member includes first and second panel members and a layer of inorganic fibrous material disposed in laminar relationship therebetween, each panel member being made of a woven metal gauze made of a metal having a heat conductivity of at least 0.95 cal-cm-sec/cm$^2$-°C., the gauze having a sufficient number of interwoven strands to prevent heat from directly contacting the inorganic fibrous material and to dispense heat without burning when subjected to a flame; and
means for joining together adjacent sides of adjacent barrier members.

21. The fire retardant barrier system of claim 20 wherein each panel member has a perimeter which is greater than the perimeter of a corresponding layer of inorganic fibrous material, wherein at least one of the ends of each panel member is bent away from the corresponding layer of inorganic fibrous material to form a flange, and wherein adjacent layers of inorganic fibrous material and flanges of adjacent barrier members are arranged in abutting contact and are held in fixed relation thereat by said joining means.

22. The fire retardant barrier system of claim 20 wherein said panel members and corresponding layers of inorganic fibrous material have substantially the same perimeter and at least one side of each barrier member is bent outwardly to form a flange, wherein adjacent flanges are arranged in abutting contact and held in fixed relation thereat by said joining means.

23. The fire retardant barrier system of claim 20 wherein the first and second panel members and the layer of inorganic fibrous material each have a perimeter, the perimeter of the first panel member being greater than the perimeter of the layer of inorganic fibrous material and the perimeter of the layer of inorganic fibrous material being greater than the perimeter of the second panel member, wherein the first panel member of each barrier member overlaps the second panel member of an adjacent barrier member and wherein adjacent panel members are held together in fixed relation by said joining means.

24. The barrier system of claim 20 wherein the metal in the woven metal gauze is copper.

25. The barrier member of claim 20 wherein the woven gauze has about 10 to 18 wire strands per centimeter; each wire having a diameter of between about 0.35 to 0.45 millimeters.

* * * * *